July 15, 1924.
J. SODERBERG
1,501,246

PROCESS FOR MAKING GLASS MOLD PLUNGERS

Original Filed Sept. 9, 1921   2 Sheets-Sheet 1

INVENTOR
Jacob Soderberg
by
James C. Bradley
atty

July 15, 1924.

J. SODERBERG 1,501,246

PROCESS FOR MAKING GLASS MOLD PLUNGERS

Original Filed Sept. 9, 1921   2 Sheets-Sheet 2

INVENTOR
Jacob Soderberg
by
James C. Bradley
Atty.

Patented July 15, 1924.

1,501,246

UNITED STATES PATENT OFFICE.

JACOB SODERBERG, OF PITTSBURGH, PENNSYLVANIA, ASSIGNOR TO PITTSBURGH PLATE GLASS COMPANY, A CORPORATION OF PENNSYLVANIA.

PROCESS FOR MAKING GLASS-MOLD PLUNGERS.

Application filed September 9, 1921, Serial No. 499,448. Renewed January 24, 1924.

*To all whom it may concern:*

Be it known that I, JACOB SODERBERG, a citizen of the United States, and a resident of Pittsburgh, in the county of Allegheny and State of Pennsylvania, have made a new and useful Invention in Improvements in Processes for Making Glass-Mold Plungers, of which the following is a specification.

The invention relates to a process for producing plungers for use in connection with glass molds for producing a certain headlight construction, such as disclosed in my copending application Serial No. 443,361, filed February 8th, 1921, in which application the present invention is referred to and explained.

Figure 1:
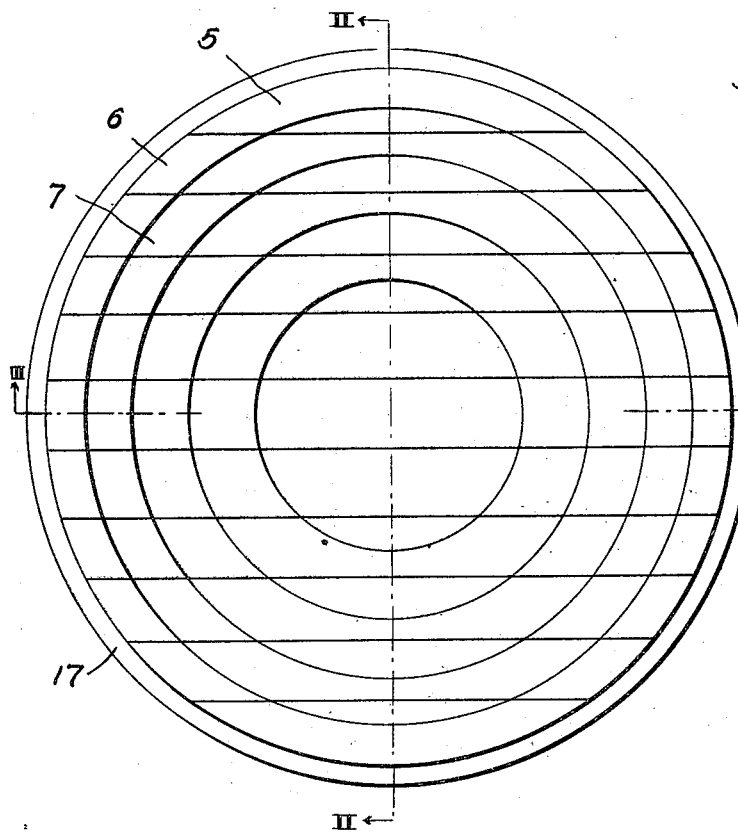
Figure 2:
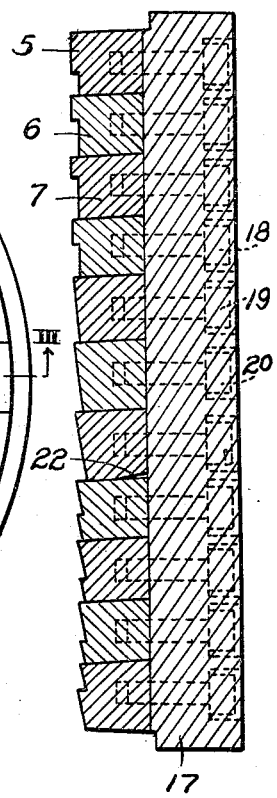
Figure 3:
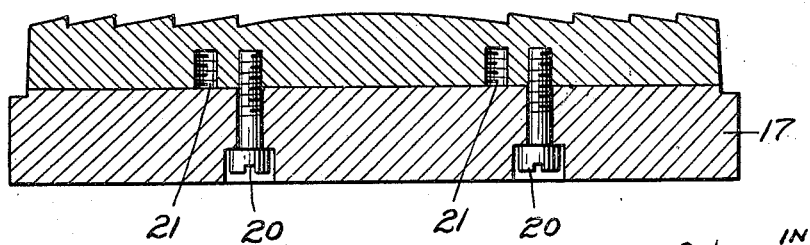

The lens construction above referred to involves the use of a set of annular prisms and a set of transverse prisms, both on the same side of the lens; and the objects of the present invention are the provision of a process whereby the plunger required to form the lens face having the two sets of prisms, may be formed with a great degree of accuracy by machine operations. This permits the use of very hard resistant metal in the plunger, such as monel metal or nichrome, which would not be practicable if the mold had to be made by the usual hand chipping method. One method of carrying out the invention is illustrated in the accompanying drawings, wherein:

Figure 1 is a front view of the plunger; Figs. 2 and 3 are sections on the lines II—II and III—III of Fig. 1; and Figs. 4, 5 and 6 are sections illustrating the successive steps in the production of the plunger.

Figure 4:
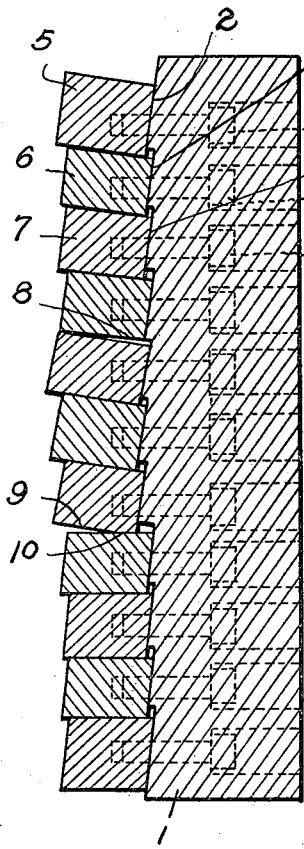

Referring first to Fig. 4, 1 is what may be termed a base plate, which is used in the first step of the operation. Transversely upon this base plate are machined the surfaces 2, 3, 4, etc., such surfaces being at the angles desired for the transverse prisms in the completed headlight. The next step in the operation is the assembling of the metal strips 5, 6 and 7 in position upon the inclined surfaces of the base plate, these strips being substantially rectangular in cross section. Because of the difference in angle of the surfaces 2, 3 and 4, the transverse strips cannot be made to fit exactly throughout along their adjacent surfaces so that in some cases the cracks 8 and 9 are left. In instances where these cracks are too large they are reduced in size by machining one of the contacting surfaces, as indicated at 10. After the strips 5, 6 and 7 are positioned, they are secured by means of the machined screws 11, 12, 13, etc.

Figure 5:
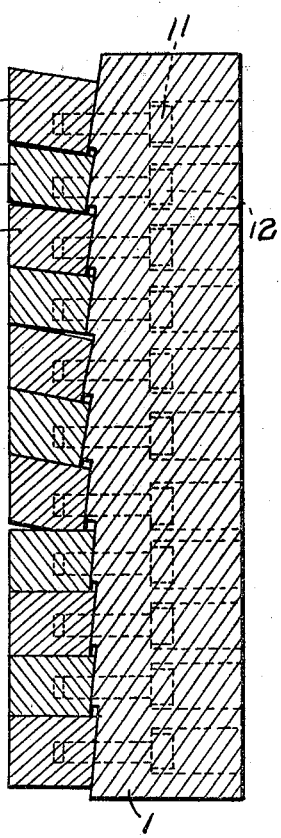
Figure 6:
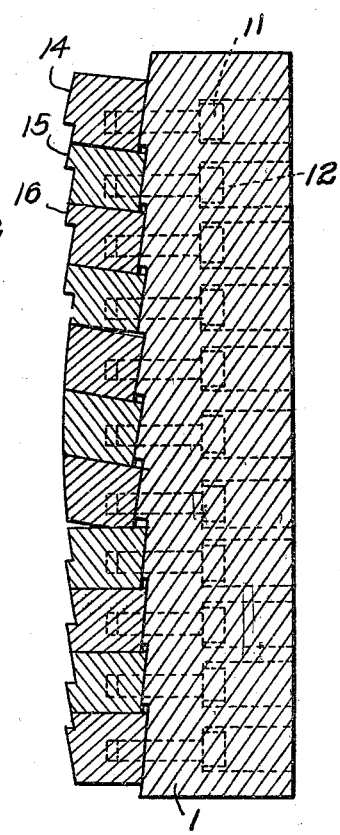

The next step in the operation is the machining of the transverse strips so that the surface presented is a flat one, as indicated in Fig. 5. The base plate 1 is then placed in a lathe and the flat surface is machined to produce the annular concentric surfaces 14, 15, 16, etc.

The transverse strips are then removed from the base plate and secured in position upon another base plate 17, as indicated in Figs. 2 and 3, such base plate having a flat front surface, so that the rear surfaces of the strips 5, 6 and 7 are brought into alinement. The strips are secured in position by a second set of machined screws 18, 19 20, etc., this second set of holding screws being required because the sockets 21 (Fig. 3) used for the machined screws 11, 12 and 13 are not at a proper angle for use with the screws 18, 19, 20, etc.

By the foregoing process a plunger is secured which has upon its one face both sets of refracting surfaces, the plunger being preferably employed in making the rear faces of the lenses or headlights so that the front side is left plain. The strips 5, 6, 7, etc. may be made out of very hard metal since their surfaces are reduced to shape by machining, which is a most desirable condition as there is less corrosion of the harder material during the use of the plunger with hot glass so that refinishing only at very infrequent intervals is necessary, and this refinishing may be done by machine work rather than by hand. Furthermore, it is possible to produce the surfaces with great accuracy, which would practically be impossible in a hand chipped mold, even if made out of relatively soft material. The finished plunger may have a certain number of cracks 22, corresponding to the crack 9 of Fig. 4, and due to the fact that the strips cannot be made to fit to each other throughout, but these cracks do not affect the completed plunger as shown in Fig. 2, as the changing of the angles of the strips in transferring them to the base plate 17 brings the cracks to the rear of the face of the plunger where they do no harm.

The process might be practiced somewhat differently although not to the same advantage by reversing the steps as illustrated in Figs. 4, 5 and 6. In these alternative processes the strips 4, 5 and 6 would first be fitted against a base plate having a flat front surface, thus leaving the front faces of the strips in alinement. The second step would involve the machining of the annular surfaces. The third step would comprise the machining of a second base plate having a plurality of transverse surfaces corresponding to the surfaces 2, 3 and 4 of Fig. 4, and the strips would then be secured to this new base plate, which would then form a part of the completed plunger. It will be seen that this procedure would give a front face to the plunger corresponding to that of Figs. 1, 2 and 3, the only difference in the two processes being that the order of the steps is reversed and the completed plunger has the base plate with the plurality of transverse inclined surfaces instead of the flat plane surface illustrated in Fig. 2. The invention contemplates both methods of procedure.

What I claim is:

1. A process for making plungers for glass molds for producing lenses having superimposed annular and transverse surfaces, which consists in forming the plunger of a base plate and a plurality of transverse strips substantially rectangular in cross-section by assembling and securing the strips side by side to the base plate to provide a composite plate, machining the front face of such composite plate to provide a series of annular prisms upon the face of the plate, and then removing the strips from the base plate, securing them upon a second base plate surface to tilt the strips from the positions occupied in their preceding positions and give them the various inclinations desired for the formation of said transverse surfaces.

2. A process for making plungers for glass molds for producing lenses having superimposed annular and transverse prisms, which consists in machining upon a base plate a series of transverse surfaces having the angles of inclination of the transverse prisms to be produced, fitting against such surfaces a set of metal strips substantially rectangular in cross-section, machining upon the outer faces of the set of strips a series of annular surfaces having the angles of inclination of the annular prisms to be produced, and then removing the strips and securing them with their rear faces against a supporting base plate having a plain surface.

3. A process for making plungers for glass molds for producing lenses having superimposed annular and transverse prisms, which consists in machining upon a base plate a series of transverse surfaces having the angles of inclination of the transverse prisms to be produced, fitting against such surfaces a set of metal strips substantially rectangular in cross-section, machining the outer faces of the set of strips to form a plane surface, machining into said plane surface a series of annular surfaces having the angles of inclination of the annular prisms to be produced, and then removing the strips and securing them with their rear faces against a supporting base plate having a plain surface.

In testimony whereof, I have hereunto subscribed my name this 1st day of September, 1921.

JACOB SODERBERG.